United States Patent [19]

Ziminski et al.

[11] 4,166,138
[45] Aug. 28, 1979

[54] PREPARATION OF BACON-LIKE MEAT ANALOG

[75] Inventors: Richard D. Ziminski, Wayzata; Myron M. Uecker, Buffalo, both of Minn.

[73] Assignee: General Mills, Inc., Minneapolis, Minn.

[21] Appl. No.: 806,234

[22] Filed: Jun. 13, 1977

[51] Int. Cl.² ............................................. A23J 3/00
[52] U.S. Cl. ..................................... 426/249; 426/656; 426/657; 426/802
[58] Field of Search ............... 426/104, 249, 656, 657, 426/802

[56] References Cited

U.S. PATENT DOCUMENTS

| | | | |
|---|---|---|---|
| 3,840,677 | 10/1974 | Leidy et al. | 426/249 X |
| 3,851,072 | 11/1974 | Huessy | 426/802 X |
| 3,930,033 | 12/1975 | Corliss et al. | 426/249 X |
| 3,984,576 | 10/1976 | Burkwall et al. | 426/249 X |

FOREIGN PATENT DOCUMENTS 872186 6/1971 Canada.
1143373 2/1969 United Kingdom.

*Primary Examiner*—Raymond N. Jones
*Assistant Examiner*—Esther M. Kepplinger
*Attorney, Agent, or Firm*—Gene O. Enockson

[57] ABSTRACT

A bacon-like product is prepared preferably having alternating zones simulating lean strata and fat strata. Dough is prepared including protein material, water and oil. The dough is shaped into a striated ribbon to resemble a bacon-like product by co-extruding a colored dough and an uncolored dough, to have at least one colored and one uncolored region. Randomization of appearance is accomplished by diverting a portion of the colored dough and intermittently or periodically injecting it into an uncolored or white region to provide streaks or another striation. The ribbon is then, at least partially, cooked, cooled and cut into strips which have the appearance of natural fried bacon.

3 Claims, 1 Drawing Figure

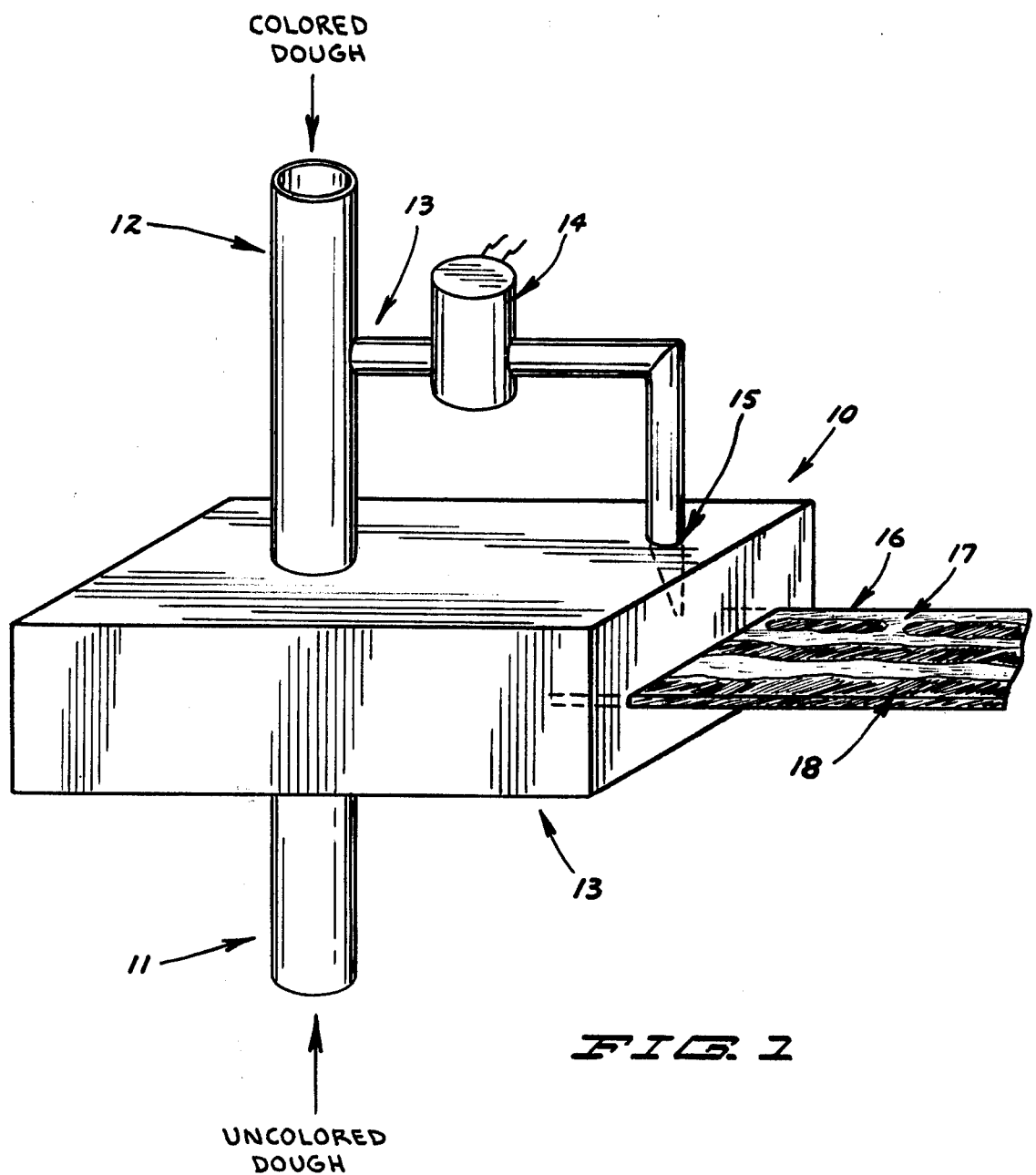

PREPARATION OF BACON-LIKE MEAT ANALOG

BACKGROUND OF THE INVENTION

The present invention relates to meat-like food products generally referred to as meat analogs. More particularly, it relates to meat analogs which simulate bacon, such as slices which have a fried appearance and texture resembling fried bacon.

Sliced fried bacon and fried ham have long been preferred meats for eating at breakfast time. In recent years, concern has developed with regard to bacon, ham and other natural meat products. Such concern has centered on the fact that meat products have a relatively high cholesterol and saturated fat level. This is particularly a problem for certain persons having heart disorders. In view of this and of the relatively high cost of meat products, meat analogs have received a good deal of attention. Meat analogs are generally prepared from vegetable protein, such as soy flour and/or soy isolate. The fat or oil content of meat analogs can be controlled and, in fact, the cholesterol content can be essentially eliminated. A variety of bacon-like products have recently become commercially available.

Illustrative of one such meat analog or meat-like product can be seen in U.S. Pat. No. 3,320,070 to Hartman. In this patent, vegetable protein fibers are bound together with an edible binder comprising albumin and edible proteinate and formed into a product having simulated lean and non-lean portions. In the product, in addition to vegetable oil and water, there is employed a vegetable gum stabilizer, such as guar gum.

Another product can be seen from U.S. Pat. No. 3,840,677 relating to a bacon-like meat analog. This analog is prepared from differently colored emulsions of fat, water and heat coagulable protein having incorporated therein one or more protein fillers, colors, flavors and the like. A general reference is made to the use of a thickening agent in the lean phase or region, said thickening agent being exemplified by carboxymethyl cellulose (CMC). Guar, locust bean gum and seaweed extract are also mentioned. As disclosed in this patent, the product has fatty and lean phases composed as follows on a dry basis:

| Ingredient | Fatty Phase (%) | Lean Phase (%) |
| --- | --- | --- |
| Water | 20-30 | 40-65 |
| Fat | 30-50 | 10-25 |
| Albumen | 7-20 | up to 15 |
| Protein Isolate | 0- 5 | 6-24 |
| Proteinaceous Filler | 0-20 | 0-15 |
| Color and Flavoring Agents | To taste, usually | 5-15 |
| Thickening Agent | — | 0- 2 |

Similarly, in Canadian Pat. No. 872,186 to Rispoli, et al, there are disclosed dough layers composed of proteinaceous material, such as egg albumen which may also contain fat, a gum, starch, sugar and flavoring materials.

In addition to the foregoing patents, U.S. Pat. No. 3,840,677 contains reference to and general discussion, in columns 1 and 2, of numerous patents in this general area which may find application in meat analogs.

Further, U.S. Pat. No. 3,851,072 to Huessy deals with food flavor pellets having a meat texture, such as ham pellets, said pellets having a wheat flour, soy flour and vegetable protein or tow base. Included in these pellets is a hydrocolloid, preferably xanthan gum.

SUMMARY OF INVENTION

Natural bacon does not possess uniform striations of lean and fatty portions, but instead presents a randomized appearance. The present invention provides a means for producing a bacon-like meat analog which has a randomized appearance more closely resembling that of natural bacon. This product is provided by forming a colored and uncolored dough into a ribbon by co-extrusion in an extrusion die to provide a ribbon having at least one colored region and at least one uncolored region and intermittently or periodically injecting an additional portion of colored dough into the uncolored region or phase. In this way, an additional colored region or phase is introduced into the uncolored or fatty region, providing a more natural, randomized appearance. Each phase or region formed by the doughs is composed of protein isolate, water, a fat, and a binder such as egg albumen, a thickening agent such as a gum, and also generally containing proteinaceous filler particles, colored with coloring, and flavoring ingredients. After extrusion, the ribbon is then, at least partially, cooked (generally deep fat frying), cooled and then cut into strips which have the appearance of natural fried bacon.

The invention can further be understood by reference to the drawing.

FIG. 1 is a perspective diagrammatic view of one form of apparatus by which the invention may be practiced wherein a portion of the colored region is diverted and, by means of a valve, injected downstream into the uncolored region of the ribbon.

DESCRIPTION AND PREFERRED EMBODIMENTS

In this detailed discussion which follows below, all percentages, parts and the like are on a weight basis unless otherwise indicated.

The present invention, accordingly, provides a bacon-like meat analog that more closely resembles bacon than products heretofore found available. Broadly, the present simulated bacon product may be prepared by mixing two doughs, one being substantially uncolored and resembling in appearance the fat portion of bacon and the other dough containing a red dye resembling in appearance the lean portion of bacon, and the doughs are simultaneously extruded through a common extrusion die generally designated in the drawing by reference numeral 10 within which alternating flows of dough are brought into contact with one another. The flows of dough are sticky and, upon contacting one another, fuse together. The uncolored dough resembling the fatty portion is shown as being conveyed to the die 10 through conduit 11 while the colored dough resembling the lean portion is shown as being conveyed to die 10 through conduit 12. For convenience the conduit 11 for the fatty portion is shown as entering from the lower surface of the die. However, both inlet conduits 11 and 12 may be placed in any desirable location for co-extrusion. Within the die the conduits 11 and 12 may divide into a plurality of openings to provide any desirable number of striations. Generally, to most closely resemble natural bacon, two colored and two uncolored striations are provided.

The colored dough conduit 12 is provided with a bypass conduit 13 which is controlled by a valve 14, such as a rotary valve or other equivalent means. For simplicity, this conduit 13 is shown externally to the die. In practice, this conduit 13 may be a channel within the die 10 controlled by a rotating shaft in the die which acts as the rotary valve means. Opening and closing of the valve can be carried out by any desirable automatic means (not shown) which will intermittently or periodically open the valve and inject a pulse of a portion of the colored dough downstream from the inlet conduit 12 through inlet 15 into an already formed uncolored portion. Through this extrusion mechanism there is provided a striated ribbon or strip generally designated in the drawing by reference numeral 16 having at least one uncolored (fatty) region 17 and at least one region resembling the lean portion 18. The width and thickness of the strip or ribbon 16 is such that, after frying, it will resemble a bacon slice. Accordingly, the width will generally be about 1-2 inches and thickness about 0.025-0.15 inches. Any of various pumps, augers and the like may be used to deliver the flow of dough to a die.

The ribbon 16 is conveyed to a hot oil bath, having a temperature of between about 220° to 410° F., preferably 275° to 350° F. and partially fried therein for between 100 and 10 seconds, preferably between 35 and 15 seconds. The moisture content of the fried product may be in the range of 5 to 30%. During frying, the white phase expands more than the red phase does, causing the final product to have two separate textures similar to natural bacon. The strip shrinks to a mildly rippled appearance which will further expand and ripple during the final preparation process in the home.

Upon removal of the strip from the hot oil bath, the strip is blasted with an air blast to remove any excess oil from the strip.

The strip is then cooled, preferably by a water quench, either by a water spray or water bath or both. Ambient air cooling can be employed; however, this requires much more floor space for air cooling conveyer systems. The water cooling further provides for a "sizzling" effect in subsequent frying operation in final use through water adhering to the product. In the water quench, the water temperature is below 32° C. and preferably below 13° C. Preferably the water temperature is not below 7° C. Water at ambient room temperature, i.e. about 23° C. can be employed. The combination of a water spray just prior to conveying the ribbon through the water bath is the preferred practice.

After cooling, the ribbons or strips are cut to a length to resemble bacon slices and packaged, a convenient length being about six to seven inches.

In use, the simulated bacon slices will be heated in a skillet containing vegetable oil for about ten minutes until golden brown resembling very closely natural fried bacon slices. Alternatively, the slices may be baked in an oven for about ten minutes at 350° F.

Generally the two doughs resembling the fatty strata and the lean strata, will, in addition to water, fat (oil), flavoring and a gum (preferably xanthan gum), include protein material such as soybean isolate and a binder, such as albumin, and proteinaceous filler. The ratio of white to red phase is not critical but, since the product is desired to resemble conventional bacon, the ratio is about 60% white to 40% red. To provide a leaner appearing bacon-like product, the ratio may be reversed to 60% red and 40% white. In practice, a ratio of about 57% lean to 43% white is desirably employed.

The protein material of the present invention may be any edible material in a finely divided condition (dehydrated or in a slurry) and having at least 50% protein content. The protein material may be obtained from any animal or vegetable source. For example, the protein material may be dehydrated, processed microbial protein, albumen or oil seed protein isolate or concentrate. Illustrative oil seed protein materials are defatted meals and flours of soybean, cottonseed, peanut and sesame. Other suitable protein materials include fish meal, wheat gluten, yeast, sodium caseinate and the like. As described in U.S. Pat. No. 3,840,677, the proteinaceous filler referred to earlier above is preferably ground to a size such that 90% of the material passes through a 45 mesh U.S. Standard Sieve and such that at least 80% passes through a 50 mesh U.S. Standard Sieve. This finely ground proteinaceous filler material is desirable from a cost standpoint and provides for increased protein content in the product.

The total protein material which may be present in the white dough will generally be in the range of about 10-70% and, preferably, about 30-40% by weight based on total weight of white dough. Similarly, the total protein which may be present in the red dough will generally lie in the range of about 10-60% and, preferably, about 30-45% based on the total weight of red dough. The total protein content in the formed product, including white and red dough, will generally lie in the range of about 25-40% preferably about 35%.

The doughs each contain adequate amounts of water (i.e., moisture) to maintain the protein in a cohesive fused mass suitable for extrusion into a strip or ribbon. Typically, the white dough may have moisture added in an amount of 15 to 40%, preferably about 25%. The red dough may have moisture added in an amount of 20 to 70%, preferably about 40%. The total water or moisture content will typically lie in the range of about 20-40%, and, preferably, about 35%.

The fat or oil may be any edible vegetable or animal oil. It is advantageous to use all vegetable oil since this avoids or reduces the presence of cholesterol. The oil, for example, may be cottonseed oil, soybean oil, corn oil, safflower oil and the like. The fat or oil will typically be present in an amount of about 15-40%, and, preferably, about 30%, in the white dough and in an amount of 3-30%, and, preferably, about 5% in the red dough. The total fat or oil content, including both white and red doughs, will generally lie in the range of about 10-30%, and, preferably, about 18%.

The selection of flavoring agents and coloring employed should be made in order to render the bacon analog as closely as possible in flavor and appearance to the natural fried product. Such flavoring agents may include sugar, salt, pepper, hydrolyzed vegetable protein (HVP), autolyzed yeast, monosodium glutamate, nucleotides, imitation and natural flavors, imitation and natural aromas and flavor enhancers. The products may also include enriching agents, such as vitamins.

As indicated earlier hereinabove, the product generally will contain a gum. The preferred gum of use is xanthan gum although any of the other gums discussed earlier in relation to the background of the invention may desirably be employed, either alone or in combination.

The hydrocolloid, xanthan gum is available commercially. As disclosed in U.S. Pat. No. 3,851,072, this gum is a high molecular weight linear polysaccharide. It is classified as a carbohydrate, a complex polysaccharide derived from Xanthomonas microorganisms and, more specifically, Xanthomonas Campestris. It is linear in structure and contains d-glucose, d-mannose and d-glucuronic acid. A detailed description of one method of preparation of xanthan or xanthomonas gum can be found in column 3 of U.S. Pat. No. 3,996,389 to John Osborne, the disclosure of which is incorporated herein by reference. The xanthan levels will typically be on the order of from 0.05 to 0.4% in the white dough and from 0.1 to 0.8% in the red dough, the level of xanthan in the red dough being at least about twice that of the white dough, with the most preferred levels in the red dough being about 0.2–0.4%. The total xanthan levels, including white and red doughs, will, accordingly, generally lie in the range of about 0.15–1.2% and most preferably within about 0.2–0.6%.

The general and preferred compositions of the regions in this invention can be seen from the following:

| Ingredient | General Ranges | |
| --- | --- | --- |
| | Fatty Phase (%) | Lean Phase (%) |
| Water | 15–40 | 20–70 |
| Fat | 15–40 | 3–30 |
| Albumen | 5–20 | up to 15 |
| Protein Isolate | up to 15 | up to 15 |
| Proteinaceous Filler | up to 20 | up to 20 |
| Xanthan Gum | 0.05–0.4 | 0.1–0.8 |
| Flavoring | up to 15 | up to 15 |

| Ingredient | Preferred | |
| --- | --- | --- |
| | Fatty Phase (%) | Lean Phase (%) |
| Water | About 25 | About 40 |
| Fat | About 30 | About 5 |
| Albumen | About 10 | About 5 |
| Protein Isolate | About 10 | About 15 |
| Proteinaceous Filler | About 13 | About 18 |
| Xanthan Gum | About .1 | About .4 |

The invention may further be illustrated by means of the following examples:

EXAMPLE I

A bacon analog is prepared according to the present invention by preparing an uncolored dough and a red colored dough using the following ingredients in the amounts indicated.

| Ingredient | % by weight | |
| --- | --- | --- |
| | Uncolored | Red Colored |
| Water | 23.47 | 40.42 |
| Fat | 30.10 | 4.90 |
| Albumen | 8.32 | 3.67 |
| Protein Isolate | 11.53 | 14.52 |
| Proteinaceous Filler | 13.31 | 18.68 |
| Wheat Flour | 0 | 2.45 |
| Xanthan Gum | .11 | .37 |
| Flavoring Agent | 12.35 | 14.94 |
| Vitamin | .02 | .02 |
| Emulsifier (Mono and Diglycerides) | .51 | 0 |
| Trisodium Phosphate | .28 | 0 |
| Color | 0 | .03 |
| | 100.00% | 100.00% |

The uncolored dough and the red dough are co-extruded to produce a flat strip having a plurality of red and white (i.e. uncolored) stripes. During the course of the co-extrusion, a portion of the red dough is diverted and intermittently, about every three inches, injected downstream into one of the white stripes. The injection is carried out by automatic actuation of a rotary valve. The strip, slightly over one inch wide and about 0.05 inch thick, is sticky and fragile. The strip is deposited on a conveyor which carries the continuous strip through a deep fat fryer. The fryer is at a temperature of about 300° F. and the residence time in the fryer is about 25–30 seconds. The excess oil on the surface of the strip is blown off by a blast of air as the strip is removed from the oil bath. The strip develops some wrinkles or ripples (i.e., becomes wavy) during frying due to differential expansion. Following frying, the strip is conducted on a conveyor to the water bath. Just prior to entry through the bath the ribbon is sprayed with water at a temperature of 11° C. The water bath temperature is 12° C. The continuous strip, which is stiffened after the cooling, is then cut into pieces having a length of about six inches and packaged. The pieces are later placed in a skillet at about 350° F. and cooked for about ten minutes, the skillet being lightly coated with vegetable oil. The strips are turned over several times during cooking. The strips have a wrinkled condition and closely simulate natural bacon.

The embodiments of the invention in which an exclusive property or privilege is claimed are defined as follows:

1. In a process of preparing a bacon-like meat analog wherein
   (a) colored and uncolored extrudable doughs are first prepared, said colored dough comprising, by weight, 20–70% water, 3–30% fat, up to 15% albumen, up to 15% protein isolate, up to 20% proteinaceous filler, about 0.1–0.8% xanthan gum and up to 15% flavoring agents, said uncolored dough comprising, by weight, 15–40% water, 15–40% fat, 5–20% albumen, up to 15% protein isolate, up to 20% proteinaceous filler, about 0.05–0.4% xanthan gum and up to 15% flavoring agents, and said colored dough also containing coloring so that upon being cooked it will resemble the lean region of fried bacon whereas the uncolored dough upon being cooked will resemble the fatty region of fried bacon,
   (b) the colored and uncolored doughs are simultaneously co-extruded through a common extrusion die to form a striated ribbon about 1 to 2 inches wide and about 0.025 to 0.15 inches thick having at least one colored region and at least one uncolored region which, upon cooking, will resemble the lean and fatty regions of cooked bacon, and
   (c) the striated ribbon is subsequently at least partially cooked for about 10 to 100 seconds in a hot oil bath having a temperature of about 220° to 410° F., cooled and then cut into strips which have the appearance of fried bacon, the improvement comprising diverting a portion of said colored dough during said co-extrusion and injecting a variable portion of said colored dough into at least one uncolored region of said ribbon thereby providing a randomized appearing bacon-like analog.

2. A process as defined in claim 1 wherein said ribbon is comprised of two alternating colored and two alternating uncolored regions prior to injecting a portion of said colored dough into one of said uncolored regions of said ribbon.

3. A process as defined in claim 1 wherein said injecting of said colored dough is accomplished by intermittently actuating a valve means for injecting a pulse of said colored dough.

* * * * *